(12) United States Patent
Tanaka

(10) Patent No.: US 8,243,243 B2
(45) Date of Patent: Aug. 14, 2012

(54) DISPLAY DEVICE

(75) Inventor: Hironao Tanaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 129 days.

(21) Appl. No.: 12/190,831

(22) Filed: Aug. 13, 2008

(65) Prior Publication Data

US 2009/0046234 A1    Feb. 19, 2009

(30) Foreign Application Priority Data

Aug. 17, 2007  (JP) .................................. 2007-212569

(51) Int. Cl.
*G02F 1/1343* (2006.01)

(52) U.S. Cl. ......... 349/144; 349/139; 349/141; 349/145

(58) Field of Classification Search .................. 349/141, 349/145, 144, 139
See application file for complete search history.

(56) References Cited

U.S. PATENT DOCUMENTS

| | | | | |
|---|---|---|---|---|
| 6,982,776 | B2 * | 1/2006 | Nagano et al. | 349/141 |
| 7,064,734 | B2 * | 6/2006 | Kawamura et al. | 345/80 |
| 7,773,182 | B2 * | 8/2010 | Kimura et al. | 349/141 |
| 2003/0043327 | A1 * | 3/2003 | Aoyama et al. | 349/141 |
| 2003/0058374 | A1 * | 3/2003 | Takeda et al. | 349/33 |
| 2005/0078260 | A1 * | 4/2005 | Ono et al. | 349/141 |
| 2005/0105032 | A1 * | 5/2005 | Ono et al. | 349/139 |
| 2005/0105033 | A1 * | 5/2005 | Itou et al. | 349/141 |
| 2005/0117079 | A1 * | 6/2005 | Pak et al. | 349/43 |
| 2005/0140899 | A1 * | 6/2005 | Ko | 349/141 |
| 2005/0280763 | A1 * | 12/2005 | Kang et al. | 349/141 |
| 2007/0229749 | A1 * | 10/2007 | Kaneko et al. | 349/141 |

FOREIGN PATENT DOCUMENTS

| | | |
|---|---|---|
| JP | 2000-056320 A | 2/2000 |
| JP | 2005-107535 A | 4/2005 |
| JP | 2005-196162 A | 7/2005 |
| JP | 2007-003877 A | 1/2007 |
| JP | 2007-164200 A | 6/2007 |
| WO | 01/18597 A1 | 3/2001 |

OTHER PUBLICATIONS

Japanese Patent Office, Office Action issued in Patent Application JP 2007-227169, on Sep. 8, 2009.

* cited by examiner

*Primary Examiner* — Edward Glick
*Assistant Examiner* — Sang Nguyen
(74) *Attorney, Agent, or Firm* — SNR Denton US LLP

(57) ABSTRACT

An embodiment of the invention provides a display device having a common electrode and pixel electrodes disposed in an insulating state on one of a pair of substrates between which a liquid crystal layer is held, in which each of the pixel electrodes includes a plurality of electrode portions disposed in parallel with one another, each of the electrode portions has a flat surface shape in which each of the electrode portions is bent approximately at a central portion in an extension direction, and each of the pixel electrodes also includes a bridge portion through which corresponding ones of the electrode portions are connected to one another in the bending portion.

7 Claims, 9 Drawing Sheets

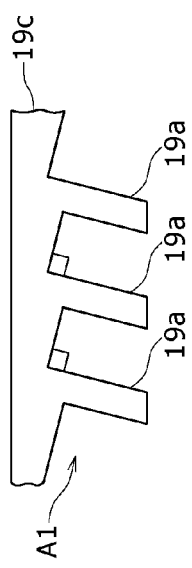
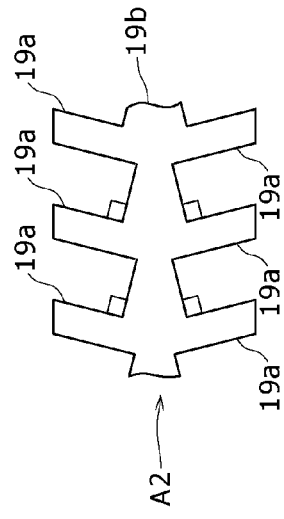
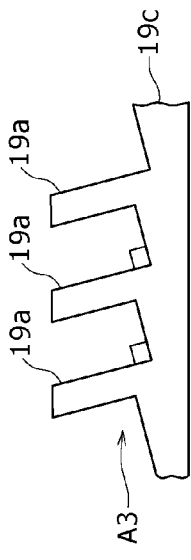
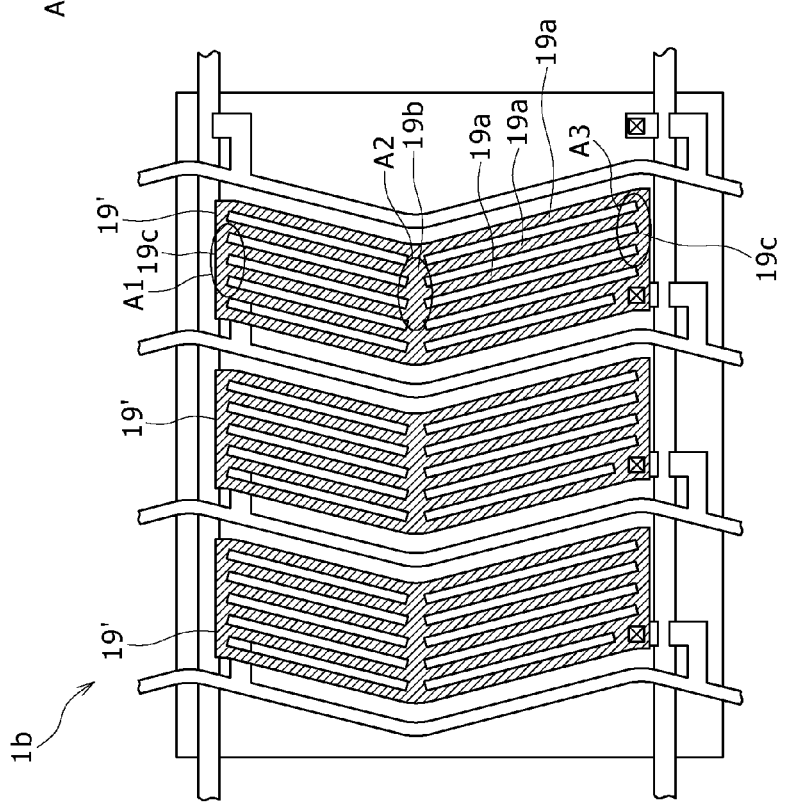

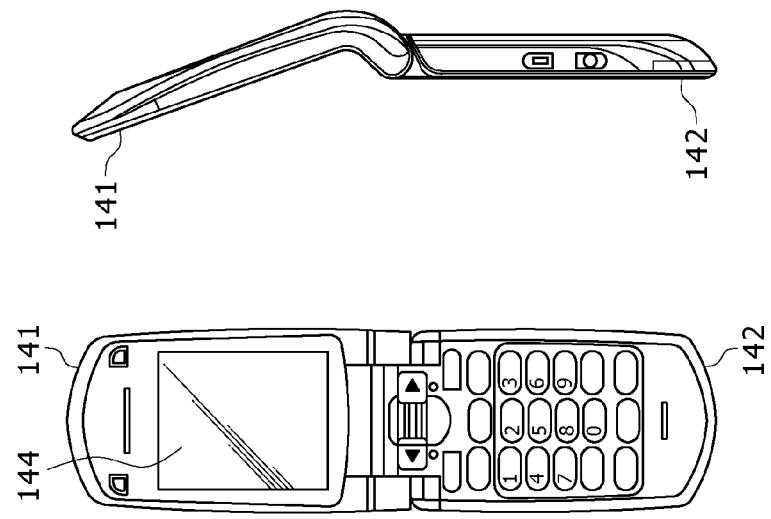
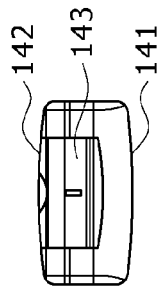
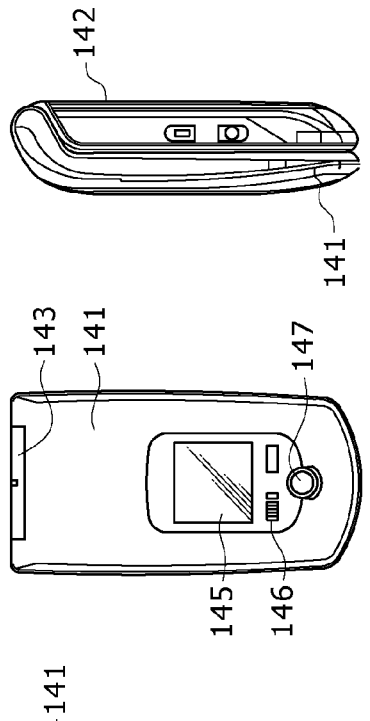
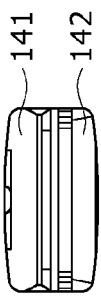

DISPLAY DEVICE

CROSS REFERENCES TO RELATED APPLICATIONS

The present invention contains subject matter related to Japanese Patent Application JP 2007-212569 filed in the Japan Patent Office on Aug. 17, 2007, the entire contents of which being incorporated herein by reference.

BACKGROUND OF THE INVENTION

1. Field of the Invention

The present invention relates to a display device, and more particularly to a display device which drives liquid crystal molecules by using a transverse electric field mode.

2. Description of the Related Art

Transverse electric field modes which liquid crystal display devices have attract attention as liquid crystal modes with each of which a wide viewing angle, and a high contrast are realized. An aperture ratio and a transmittance are further improved in one of those liquid crystal modes, especially, a Fringe Field Switching (FFS) mode than in an In-Plane-Switching (IPS) mode.

FIG. 11 is a top plan view showing an example of a main portion of a liquid crystal display device having the FFS mode. As shown in the figure, in the liquid crystal display device having the FFS mode, a plurality of scanning lines 203 and a plurality of signal lines 205 are wired in a matrix on a substrate 201 on a drive side. Also, pixel electrodes 209 are provided in intersection portions in which the plurality of scanning lines 203 and the plurality of signal lines 205 intersect with each other, respectively. Each of the pixel electrodes 209 is formed in sinking comb-like shape in which a plurality of electrode portions 209a extend along each of the signal lines 205 (or each of the scanning lines 203) by performing the patterning.

In addition, although an illustration is omitted here, a common electrode is provided in a state of being insulated from the pixel electrodes 209 through an insulating film below the pixel electrodes 209 on the substrate 201. This common electrode is provided at the same level as that of each of the scanning lines 203, or in an upper layer with respect to the scanning lines 203 and the signal lines 205. Thus, this common electrode is provided over the entire surface within at least a pixel "a".

It is desirable for further improving the view angle characteristics in the liquid crystal display device which has the FFS mode and which is structured in the manner described above, it is advantageous to adopt a multi-domain structure in which the liquid crystal molecules "m" are dividedly aligned. In this case, as shown in FIG. 11, each of the electrode portions 209a is bent in different directions at a central portion along the extension direction, Thus, each of the pixels "a" is divided into two regions in which the corresponding ones of the electrode portions 209a extend in different directions. It is preferable to have mirror symmetry with a region boundary portion as a symmetric axis in terms of the optical characteristics. As a result, the liquid crystal molecules "m" are driven in different rotational direction in the two regions into which the pixel "a" is divided. Thus, the viewing angle characteristics (color shift) in a phase of halftone display or white display are improved. This technique, for example, is described in U.S. Pat. No. 6,809,789.

SUMMARY OF THE INVENTION

However, although the viewing angle characteristics were certainly improved in the liquid crystal display device having the FFS multi-domain structure as described above, the following new problem was discovered.

That is to say, when an outside pressure (such as finger tough) is applied to a display surface of the liquid crystal display device in a state in which white is displayed by applying a voltage across corresponding one of the pixel electrodes and the common electrode, a so-called reverse twist phenomenon is caused in which the liquid crystal molecules are rotated in a direction reverse to the electric field direction within the pixel. It was found out that the reverse twist phenomenon becomes a factor causing display heterogeneity (hereinafter referred to as "finger touch heterogeneity"), and does not become normal again in a naturally uncontrolled state.

In the light of the foregoing, it is therefore desirable to provide a liquid crystal display device which is capable of causing finger touch heterogeneity to disappear in a naturally uncontrolled state in a transverse electric field multi-domain structure.

In order to attain the desire described above, according to an embodiment of the present invention, there is provided a display device having a common electrode and pixel electrodes disposed in an insulating state on one of a pair of substrates between which a liquid crystal layer is held, in which each of the pixel electrodes includes a plurality of electrode portions disposed in parallel with one another, each of the electrode portions has a flat surface shape in which each of the electrode portions is bent approximately at a central portion in an extension direction, and each of the pixel electrodes also includes a bridge portion through which corresponding ones of the electrode portions are connected to one another in the bending portion.

The display device having the structure as described above is a display device having a transverse electric field mode and including a plurality of electrode portions disposed in parallel with one another. Moreover, the display device has a multi-domain structure in which the liquid crystal molecules are driven in different rotational directions because each of the electrode portions has the flat surface shape in which each of the electrode portions is bent approximately at the central portion in the extension direction. In such a structure, especially, each of the pixel electrodes includes the bridge portion through which the corresponding ones of the electrode portions are connected to one another in the bending portion in which each of the electric portions is bent. As a result, as will be described in embodiments later, the following fact is found out. That is to say, even when the reverse twist phenomenon is caused by applying an outside pressure (such as finger touch) to the display surface of the display device in the state in which the liquid crystal layer is oriented by applying a voltage across corresponding one of the pixel electrodes and the common electrode, the orientation state of the liquid crystal layer becomes normal again in the naturally uncontrolled state, thereby solving the display heterogeneity due to the reverse twist phenomenon.

As set forth hereinabove, according to the present invention, it is possible to solve the display heterogeneity due to the reverse twist phenomenon in the naturally uncontrolled state in the liquid crystal display device having the transverse electric field multi-domain structure. This leads to that it is possible to enhance the display characteristics in the liquid crystal display device. In particular, in the liquid crystal display device provided with a touch panel function, the outside pressure (such as the finger touch) is applied to the display surface of the liquid crystal display device. Therefore, the present invention is applied to the liquid crystal display device provided with the touch panel function, thereby making it possible to continue the display in which the influence by the outside pressure is reduced.

BRIEF DESCRIPTION OF THE DRAWINGS

FIG. 3A is a schematic top plan view explaining a structure of a display device according to a second embodiment of the present invention;

FIGS. 3B to 3D are respectively enlarged views of main portions of a pixel electrode shown in FIG. 3A;

FIGS. 10A to 10G are respectively a front view of mobile terminal equipment, for example, a mobile phone as a further application example, in an open state, to which the present invention is applied, a side elevational view thereof, a front view thereof in a close state, a left side elevational view thereof, a right side elevational view thereof, a top plan view thereof, and a bottom view thereof.

DETAILED DESCRIPTION OF THE PREFERRED EMBODIMENTS

Preferred embodiments of the present invention will be described in detail hereinafter with reference to the accompanying drawings.

First Embodiment

Figure 1:
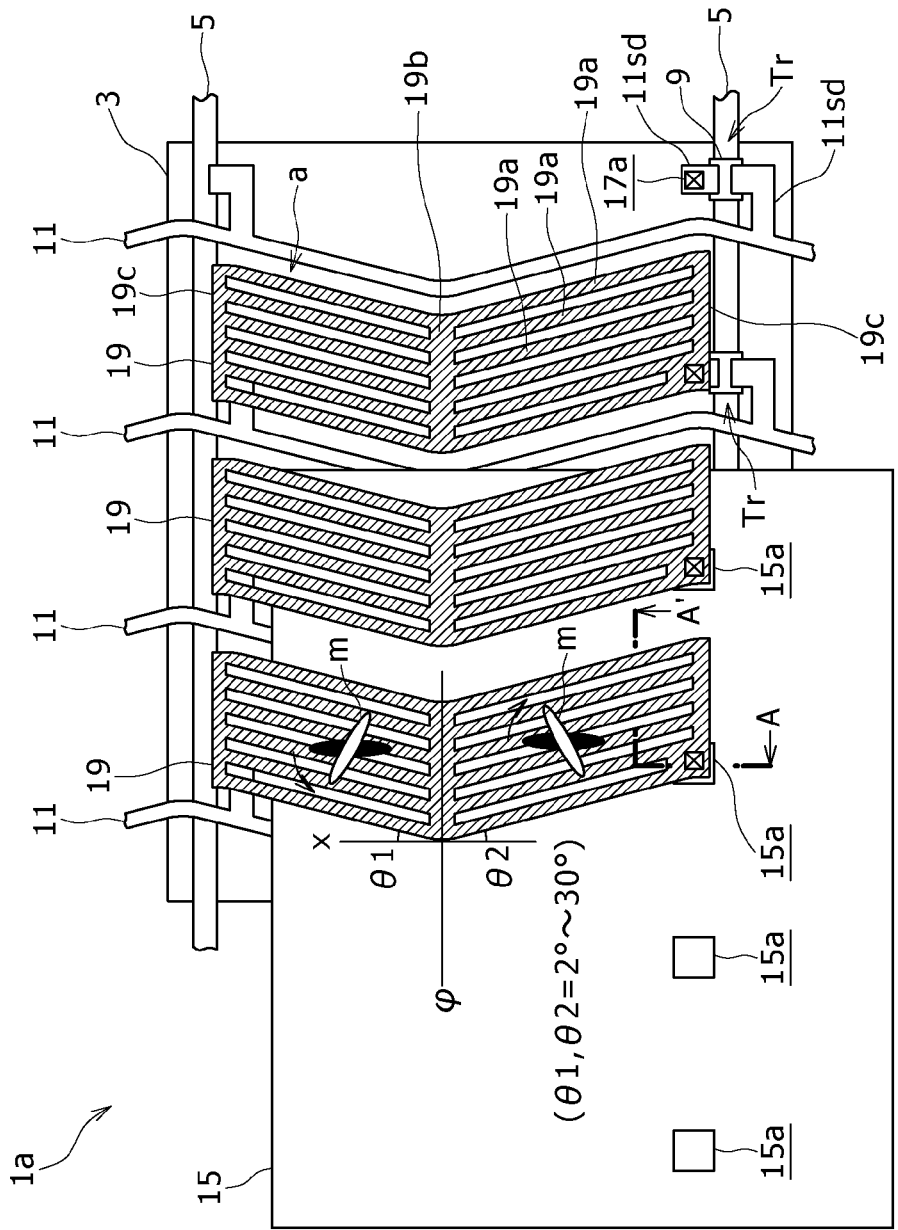
FIG. 1 is a schematic plan view explaining a structure of a display device according to a first embodiment of the present invention.
Figure 2:
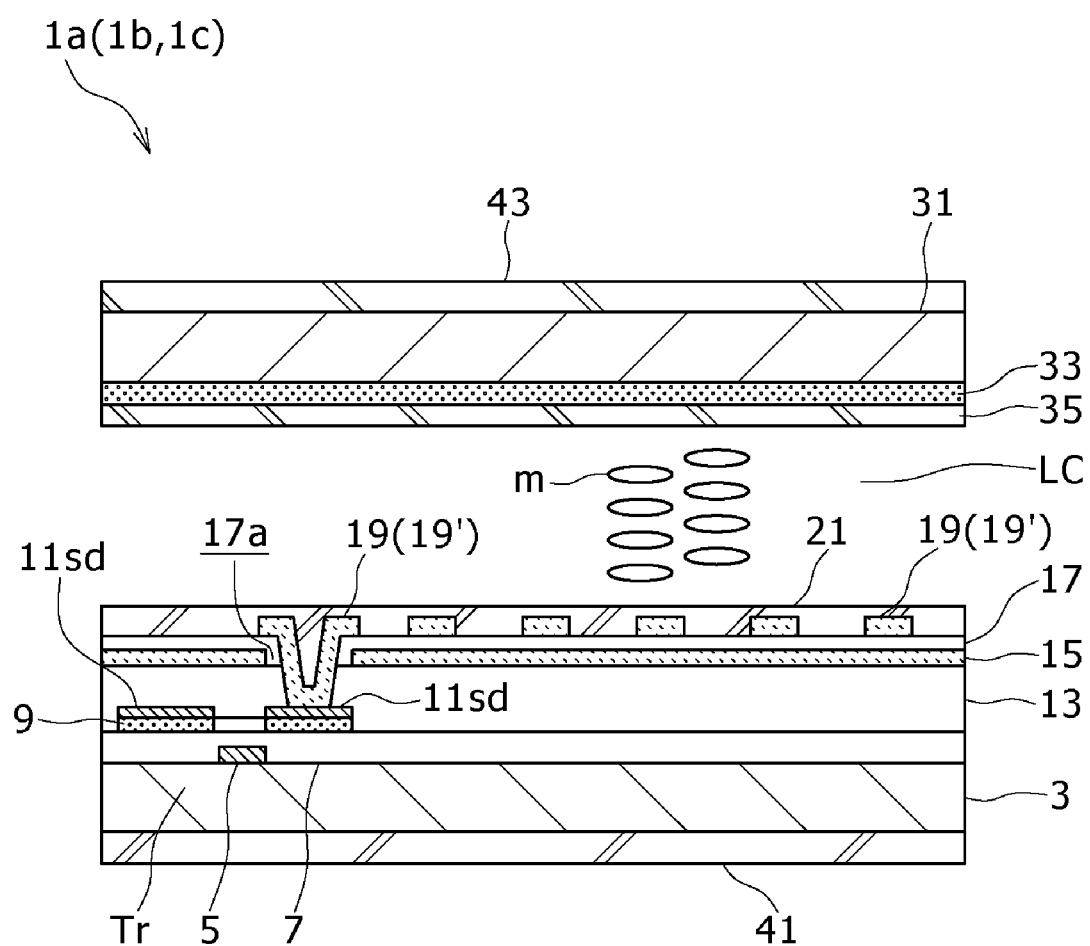
FIG. 2 is a cross sectional view taken on line A-A' of FIG. 1.

FIG. 1 is a schematic top plan view, of a drive substrate side for three pixels, explaining a structure of a display device according to a first embodiment of the present invention. FIG. 2 is a cross sectional view taken on line A-A' of FIG. 1. It is noted that an illustration of an insulating film, an alignment film, and the like is omitted in the schematic top plan view of FIG. 1.

A display device 1a shown in these figures is a liquid crystal display device having an FFS multi-domain structure. A plurality of scanning lines 5 are wired in a horizontal direction at a first level on a drive side substrate 3 having optical transparency for a visible light. In addition, a gate insulating film 7 is formed on the drive side substrate 3 so as to cover the plurality of scanning lines 5.

A semiconductor layer 9 is formed on the gate insulating film 7 to have a predetermined pattern so as to overlap in position corresponding one of the scanning lines 5. In addition, a plurality of signal lines 11 are wired on the gate insulating film 7 in a direction vertical to each of the scanning lines 5. Also, pixels "a" are set so as to correspond to intersection portions, respectively, in which the scanning lines 5 and the signal lines 11 intersect with each other. It is assumed that the semiconductor layer 9 described above is formed to have a predetermined pattern every pixel "a".

In each of the pixels "a" on the gate insulating film 7, source/drain electrodes 11sd which are laminated on both ends of the semiconductor layer 9 are provided in both sides between which corresponding one of the scanning lines 5 is held. In this case, the corresponding one of the scanning lines 5 is used as a gate electrode. In such a manner, a thin film transistor Tr is structured.

It is assumed that these source/drain electrodes 11sd are formed at the same level as that of each of the signal lines 11, and one of these source/drain electrodes 11sd extends from the corresponding one of the signal lines 11.

In addition, an interlayer insulating film 13 is formed on the gate insulating film 17 so as to cover such a thin film transistor Tr. It is assumed that this interlayer insulating film 13 has a thickness enough to allow the insulating property between the signal lines 11 and the source/drain electrodes 11sd as the lower layer and the upper layer to be reliably realized.

A common electrode 15 made of a transparent conductive material (such as an ITO or an IZO) is formed in solid film-like shape on the interlayer insulating film 13 so as to be common to all the pixels "a". In such a manner, the common electrode 15 is disposed for the scanning lines 5 and the signal lines 11 through the thick interlayer insulating film 13, thereby obtaining a structure in which the load capacitances of the scanning lines 5 and the signal lines 11 are prevented increasing. Moreover, the common electrode 15 is formed in solid film-like shape, thereby obtaining the structure in which the enhancement of the aperture ratio of the pixel is expected. However, it is assumed that an opening portion 15a through which an upper portion of the source/drain electrode 11sd, on the side of not being connected to the corresponding one of the signal lines 11 of the source/drain electrodes 11sd in each of the pixels "a" is formed in the common electrode 15.

Also, a pixel electrode 19 having the characteristic structure of the present invention is provided in each of the pixels "a" on the common electrode 15 through an insulating film 17. It is assumed that the pixel electrode 19 is made of a transparent conductive material (such as an ITO or an IZO) is connected to the corresponding one of the source/drain electrodes 11sd through a connection hole 17a formed in each of the insulating film 17 and the interlayer insulating film 13 within the corresponding one of the opening portions 15a of the common electrode 15.

As a result, the thin film transistors Tr for one scanning line are selected by an electrical signal inputted to corresponding one of the scanning lines 5, and a video signal written from the corresponding one of the signal lines 11 through the thin film transistors Tr thus selected is supplied to corresponding ones of the pixel electrodes 19.

Each of the pixel electrodes 19 is a so-called sinking comb shaped pixel electrode, and has a plurality of electrode portions 19a extending in parallel along each of the signal lines 11. In addition, the display device 1a has a multi-domain structure. Thus, it is assumed that each of the electrode portions 19a has a flat surface shape in which each of the electrode portions 19a is bent in different directions at a central portion in the extension direction, and each of the pixels "a"

is divided into two regions in which each of the electrode portions 19a extends in different directions. Also, it is preferable that a boundary through which bending portions of the electrode portions 19a are connected to one another is made a symmetric axis ϕ parallel with each of the scanning lines 5, and each, of the electrode portions 19a, extending in the different directions in the two regions has a mirror symmetry structure. In addition, it is preferable that angles θ1 and θ2 of each of the electrode portions 19a made with a line x vertical to each of the scanning lines 5 are approximately equal to each other. In this case, it is assumed that, for example, each of the angles θ1 and θ2 falls within the range of 0.5° to 45°, preferably, in the range of 2° to 30°.

In addition, the structural feature of the pixel electrode 19 in the first embodiment is that the pixel electrode 19 is provided with a central bridge portion 19b through which the electrode portions 19a are connected to the bending portions thereof. It is assumed that the central bridge portion 19b is wired in parallel with each of the scanning lines in a state of being patterned to have a predetermined width, and is provided so that all the electrode portions 19a constituting the pixel electrode 19 are connected thereto.

In addition, the pixel electrode 19 may be provided with end edge bridges 19c, for connection of the electrode portions 19a, which are formed in both end portions of the electrode portions 19a in the extension direction, respectively. Also, it is assumed that each of the end edge bridges 19c is wired in parallel with each of the scanning lines 5 in a state of being patterned to have a predetermined width, and is provided so that all the electrode portions 19a constituting the pixel electrode 19 are connected thereto.

It is noted that as illustrated in FIG. 1, the signal lines 11 are preferably bent so as to correspond to the electrode portions 19a, respectively, in terms of an improvement in the aperture ratio. However, when no notice of the aperture ration is taken, each of the signal lines 11 may be straightly wired so that a part thereof overlaps the corresponding one of the pixel electrodes 19.

Also, the alignment film 21 which is shown in only the cross sectional view of FIG. 2 is formed above the substrate 3 having the pixel electrodes 19 as described above formed thereabove, thereby structuring the upper portion of the drive side substrate 3.

On the other hand, a counter electrode 31 which is shown in only the cross sectional view of FIG. 2 is formed on a formation surface side of the pixel electrode 19 in the drive side substrate 3 as described above. The counter electrode 31 is made of an optical transparent material. In addition, a color filter layer 33 in which color filters are formed every pixel so as to have a predetermined pattern is provided on a surface of the counter electrode 31 facing the pixel electrode 19. The alignment film 35 is formed so as to cover the color filter layer 33. Also, a liquid crystal layer LC is held together with a spacer (not shown) between the alignment films 21 and 35 of the two substrates 3 and 31.

Also, polarizing plates 41 and 43 are disposed on outer surfaces of the two substrates 3 and 31, respectively, thereby structuring the display device 1a.

An optical structure in such a display device 1a is as follows.

That is to say, each of liquid crystal molecules "m" constituting the liquid crystal layer LC has a positive or negative dielectric anisotropy. In this case, it is assumed as an example that each of the liquid crystal molecules "m" has the positive dielectric anisotropy. Also, the alignment films 21 and 35 are provided so that when no electric field is applied across the common electrode 15 and the corresponding ones of the pixel electrodes 19, the liquid crystal molecules "m" are disposed so as to be approximately vertical to each of the scanning lines 5. In this case, an orientation processing direction (for example, a rubbing direction) becomes approximately vertical to each of the scanning lines 5.

Also, it is assumed that the two sheets of polarizing plates 41 and 43 provided on the outer surfaces of the substrates 3 and 31, respectively, are disposed in a cross nicol manner, and are also provided so that a transmission axis of one of the polarizing plates 41 and 43 is made to agree with the orientation direction of each of the alignment films 21 and 35. In this case, as an example, there is shown a state in which the transmission axis of the polarizing plate 43 on the counter substrate 31 side as an emission side (display side) is made to agree with the orientation direction of each of the alignment films 21 and 35.

Note that, it is assumed that although an illustration is omitted here, when the display device 1a is provided with a touch panel function, light receiving sensors are provided so as to correspond to the pixels "a", respectively. It is noted that pressure-sensitive sensors may be provided over the entire surface of the display surface.

The display device 1a having the structure as described above operates similarly to the case of the general liquid crystal display device having the FFS multi-domain structure.

That is to say, in a state in which no voltage is applied across the common electrode 15 and the corresponding one of the pixel electrodes 19, the axes of the liquid crystal molecules "m" constituting the liquid crystal layer LC are oriented so as to be vertical to the transmission axis of the polarizing plate 41 on the incidence side and so as to be parallel with the transmission axis of the polarizing plate 43 on the emission side. For this reason, the light made incident from the polarizing plate 41 on the incidence side reaches the polarizing plate 43 on the emission side to be absorbed therein without causing a phase difference in the liquid crystal layer LC, thereby obtaining black display (that is, normally black display).

On the other hand, in a state in which a voltage is applied across the common electrode 15 and the corresponding one of the pixel electrodes 19 to provide a potential difference between them, a transverse electric field is generated so as to be parallel with the drive side substrate 3 and so as to be vertical to the extension direction of each of the electrode portions 19a of the pixel electrode 19. As a result, the orientation direction of each of the liquid crystal molecules "m" is rotated within a surface parallel with the drive side substrate 3. As a result, the light made incident from the polarizing plate 41 on the incidence side is optically modulated in the liquid crystal layer LC to become a linearly polarized light which rotates by 90°. The polarizing plate 43 on the emission side transmits the linearly polarized light, thereby obtaining white display.

In addition, in such white display, each of the regions, in which each of the electrode portions 19a extends in the different directions within one pixel "a" has the multi-domain structure in which the liquid crystal molecules "m" are driven in the different rotational directions. As a result, the display is performed in which the viewing angle characteristics (color shift) in the phase of the halftone display or the white display are improved.

In particular, in the display device 1a of the first embodiment, the pixel electrode 19 is provided in structure with the central bridge portion 19b through which the electrode portions 19a are connected to one another in the bending portions of the electrode portions 19a. As a result, the electric field in the bending portion of each of the electrode portions 19a is stabilized in its shape. Thus, it is possible to stabilize the orientation state of the liquid crystal molecules "m" in each of the bending portions in the phase of the white display (in the case of the normally black display).

For this reason, even when in the phase of the white display described above, the reverse twist phenomenon is caused by applying an outside pressure (such as finger touch) to the display surface of the display device 1a, the orientation state of the liquid crystal molecules "m" constituting the liquid crystal layer LC is easy to return back the more stable original state again in the normally uncontrolled manner. Therefore, the display heterogeneity due to the reverse twist phenomenon can be solved in the naturally uncontrolled manner.

Figure 11:
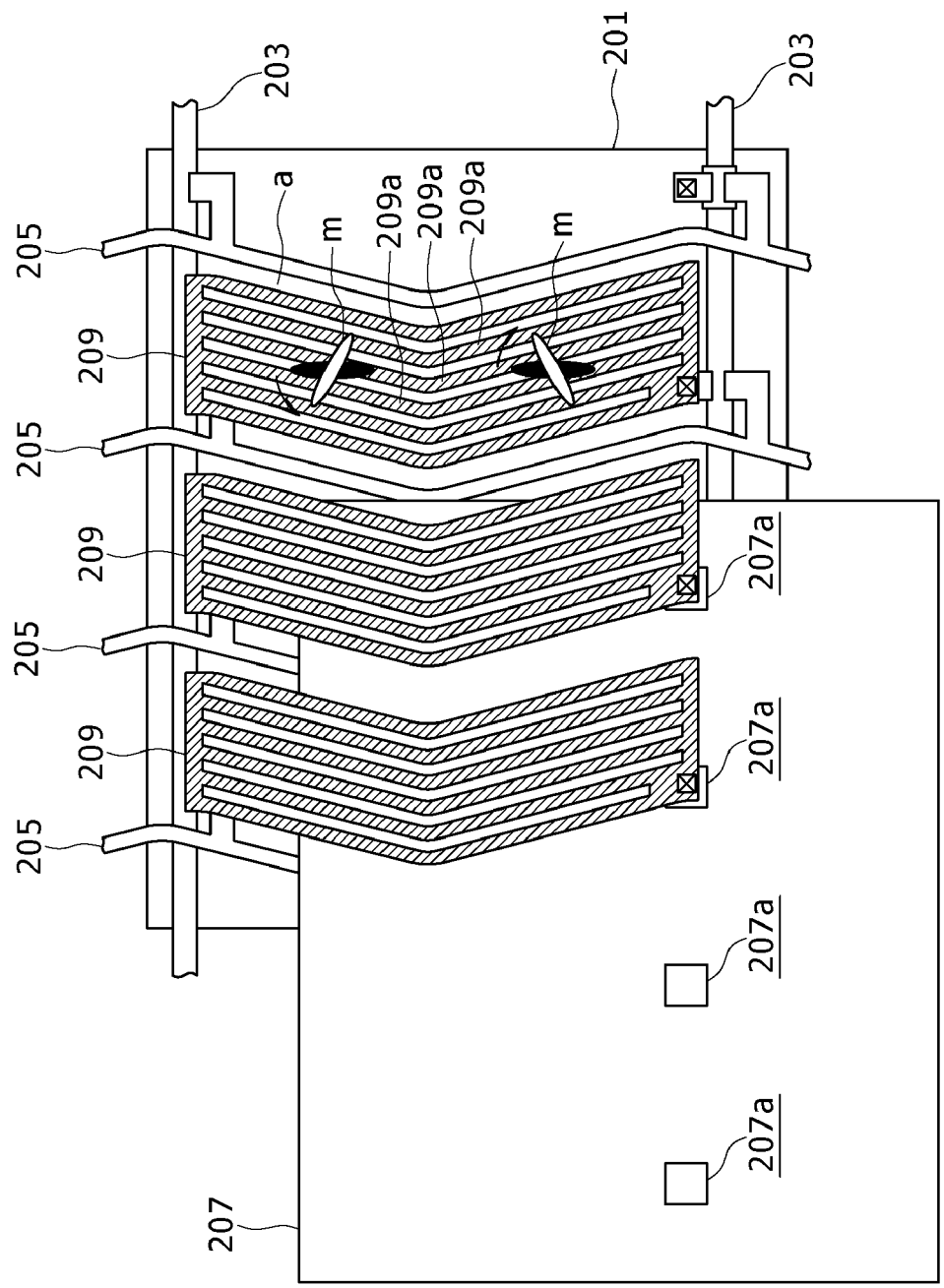
FIG. 11 is a top plan view showing an example of a main portion of a liquid crystal display device having an FFS mode in the related art.

TABLE 1 shows the results of evaluation for the finger touch heterogeneity between the structure of the first embodiment and the related art structure described with reference to FIG. 11.

TABLE 1

| | Evaluation for finger touch heterogeneity |
|---|---|
| First embodiment (FIG. 1) | Disappear approximately for about 3 seconds |
| Related art structure (FIG. 11) | Not disappear in naturally uncontrolled manner |

In this case, there was measured a time period from release of the pressure of the finger touch after completion of the finger touch against the display surface of the display device 1a to disappearance of the finger touch heterogeneity in the naturally uncontrolled manner. The first embodiment is different from the related art structure described with reference to FIG. 11 only in that in the case of the structure of the first embodiment, the central bridge portion 19b is provided in each of the pixel electrodes 19, whereas in the related art structure, the central bridge portion is provided in none of the pixel electrodes.

As shown in TABLE 1, it was confirmed that the finger touch heterogeneity which is not solved with the related art structure is naturally solved for about three seconds with the structure of the first embodiment having the central bridge 19b provided in each of the pixel electrodes 19.

As has been described so far, according to the display device 1a of the first embodiment, in the liquid crystal display device 1a having the transverse electric field multi-domain structure, it is possible to solve the display heterogeneity due to the reverse twist phenomenon in the naturally uncontrolled manner. As a result, it is possible to enhance the display characteristics. In particular, in the liquid crystal display device provided with the touch panel function, the outside pressure (such as the finger touch) is applied to the display surface of the liquid crystal display device. Therefore, the present invention is applied to the liquid crystal display device provided with the touch panel function, thereby making it possible to continue the display in which the influence by the outside pressure is reduced.

Second Embodiment

FIG. 3A is a schematic top plan view, of a drive substrate side for three pixels, explaining a structure of a display device according to a third embodiment of the present invention. Also, FIGS. 3B to 3D are respectively enlarged views of main portions A1, A2 and A3 of a pixel electrode 19'. However, for the purpose of explaining a characteristic portion of the second embodiment, an illustration of a common electrode is omitted here.

A display device 1b of the second embodiment shown in these figures is different from the display device 1a of the first embodiment described above in that the pixel electrode 19' has a flat surface shape inherent therein. Other structures of the display device 1b of the second embodiment are the same as those of the display device 1a of the first embodiment.

That is to say, it is identical to the display device 1a of the first embodiment that the pixel electrode 19' of the second embodiment includes a plurality of electrode portions 19a, in one pixel electrode, which are bent approximately at central portions thereof in the extension direction, a central bridge portion 19b through which the plurality of electrode portions 19a are connected to one another in the bending portions thereof, and end edge bridge portions 19c through which the plurality of electrode portions 19a are connected to one another in the both ends thereof in the extension direction.

In such a structure, each of the electrode portions 19a and the central bridge portion 19b thereof are formed to have a flat surface-like shape in which each of the electrode portions 19a and the central bridge portion 19b thereof are connected to each other approximately at right angles through the casting. That is to say, each of the electrode portions 19a and the central bridge portion 19b thereof are connected to each other so that each of edge portions of the electrode portions 19a and an edge portion of the central bridge portion 19b thereof make approximately at right angles with each other.

Likewise, each of the electrode portions 19a and each of the end edge bridge portions 19c are formed to have a flat surface-like shape in which each of the electrode portions 19a and each of the end edge bridge portions 19c are connected to each other to make approximately at right angles with each other through the casting. That is to say, each of the electrode portions 19a and each of the end edge bridge portions 19c are connected to each other so that each of edge portions of the end edge portions 19c and each of edge portions of the electrode portions 19a make approximately at right angles with each other.

As a result, each, of space portions S (having a punched pattern), surrounded by the electrode portion 19a, the central bridge portion 19c and the end edge bridge 19b is structured to have approximately a rectangular flat surface shape.

The display device 1b having such a structure is the liquid crystal display device having the FFS multi-domain structure similarly to the display device 1a of the first embodiment.

For this reason, even when in the phase of the white display described above, the reverse twist phenomenon is caused by applying an outside pressure (such as finger touch) to the display surface of the display device 1b, the orientation state of the liquid crystal molecules "m" constituting the liquid crystal layer LC is easy to further return back to the stable original state again in the normally uncontrolled manner. Therefore, the display heterogeneity due to the reverse twist phenomenon can be more readily solved in the naturally uncontrolled manner.

TABLE 2 shows the results of evaluation for the finger touch heterogeneity between the structure of the second embodiment and the related art structure described with reference to FIG. 11.

TABLE 2

| | Evaluation for finger touch heterogeneity |
|---|---|
| First embodiment (FIG. 1) | Perfectly disappear approximately for about 3 seconds |

TABLE 2-continued

| | Evaluation for finger touch heterogeneity |
|---|---|
| Related art structure (FIG. 11) | Not disappear in naturally uncontrolled manner |

In this case, there was measured a time period from release of the pressure of the finger touch after completion of the finger touch against the display surface of the display device 1b to disappearance of the finger touch heterogeneity in the naturally uncontrolled manner. In that in the case of the structure of the second embodiment, the central bridge portion 19b is provided in each of the pixel electrodes 19 to define the rectangular space portion S, whereas in the related art structure, the central bridge portion is provided in none of the pixel electrodes, and thus the end edge bridge has a given width.

As shown in TABLE 2, it is understood that adoption of the structure of the second embodiment in which the central bridge 19b is provided in each of the pixel electrodes 19' to define the rectangular space portion S results in that the finger touch heterogeneity which is not solved with the related art structure in the naturally uncontrolled manner can be improved to a level at which that the finger touch heterogeneity completely disappears for about three seconds.

As described above, according to the structure of the second embodiment, the display in which the influence by the outside pressure is further reduced can be performed as compared with the case of the first embodiment.

Third Embodiment

Figure 4:
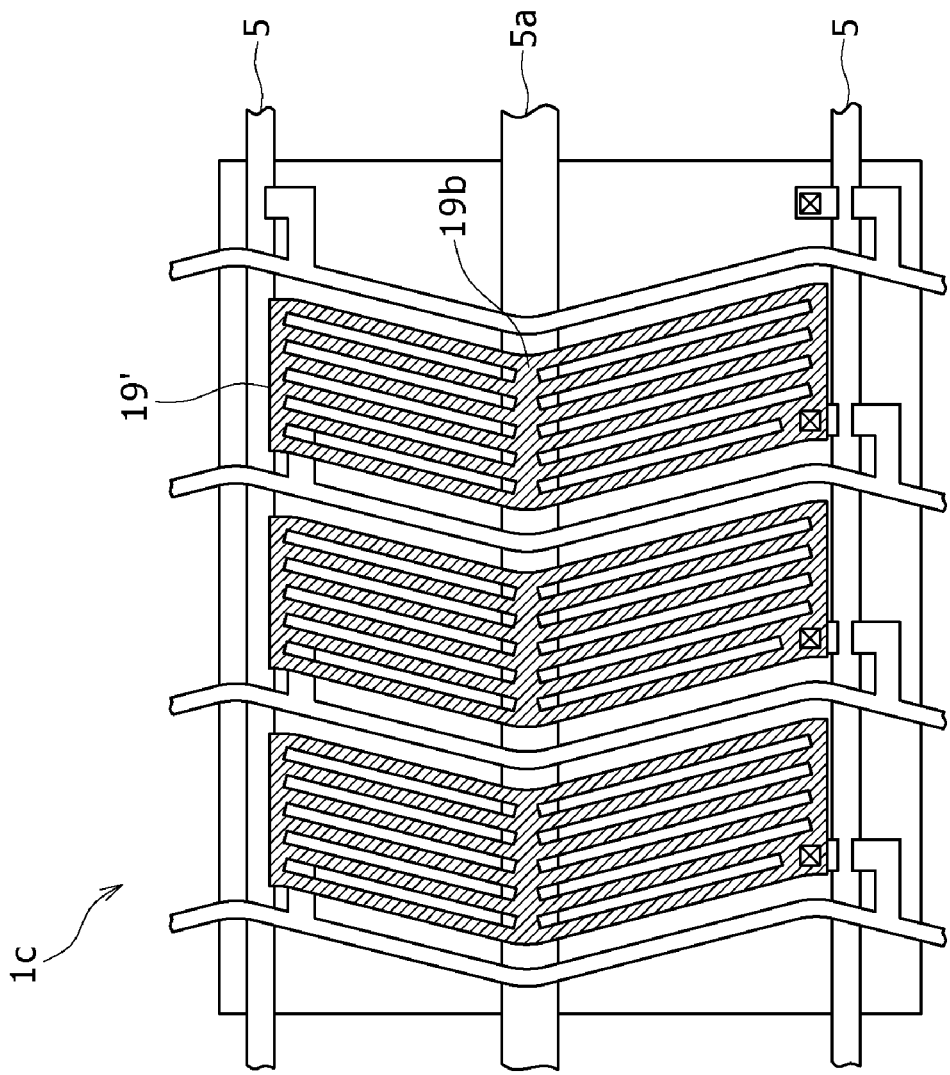
FIG. 4 is a schematic top plan view explaining a structure of a display device according to a third embodiment of the present invention.

FIG. 4 is a schematic top plan view, of a drive substrate side for three pixels, explaining a structure of a display device according to a third embodiment of the present invention. However, for the purpose of explaining a characteristic portion of the third embodiment, an illustration of a common electrode is omitted here.

A display device 1c of the third embodiment shown in FIG. 4 is different from the display device 1b of the second embodiment described above in that a light shielding pattern 5a is provided so as to overlap the central bridge portion 19b of each of the pixel electrodes 19'. Other structures of the display device 1c of the third embodiment shown in FIG. 4 are the same as those of the display device 1b of the second embodiment.

That is to say, it is assumed that the light shielding pattern 5a, for example, is formed in the same process as that for the scanning lines 5, and is disposed in parallel with each of the scanning lines 5. In addition, it is by no means limited that the light shielding pattern 5a is formed on the drive side substrate 3, and thus the light shielding pattern 5a may be formed in the form of a black matrix on the counter substrate side.

In the display device 1c of the third embodiment, the light shielding pattern 5a is disposed so as to overlap the central bridge portion 19b, thereby making it possible to prevent the reduction of the contrast. That is to say, the electric field is not formed in shape so as to be vertical to the extension direction of the electrode portions 19a in the vicinity of the central bridge portion 19b. For this reason, the liquid crystal molecules "m" cannot be normally driven, so that the display contrast is reduced. Therefore, the light shielding pattern 5a is disposed so as to overlap the central bridge portion 19b, thereby making the portion having the central bridge portion 19b disposed therein a non-transmitting region. As a result, it is possible to prevent the reduction of the display contrast.

The third embodiment may be combined with the first embodiment. In this case, the same effects can be obtained.

It is noted that in the first to third embodiments described above, the description has been given with respect to the structure in which the common electrode 15 is disposed above the scanning lines 5 and the signal lines 11. However, the present invention can also be applied to the display device having the FFS multi-domain structure in which the common electrode 15 is provided at the same level as that of each of the scanning lines 5 or each of the signal lines 11. In this case, the same effects can be obtained.

Figure 5:
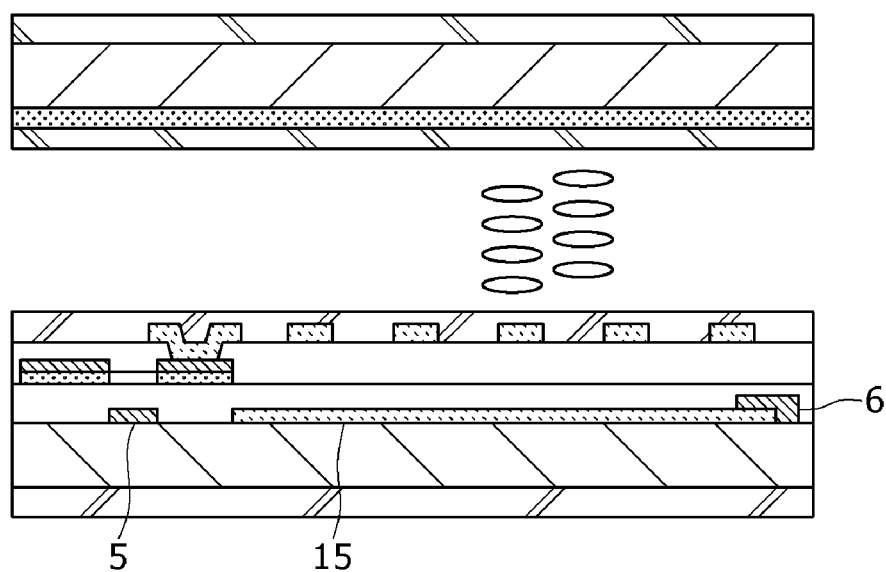
FIG. 5 is a cross sectional view explaining a structure of a display device according to another embodiment of the present invention.

For example, as shown in FIG. 5, the common electrode 15 may be provided at the same level as that of each of the scanning lines 5. In this case, it is assumed that the common electrode 15 made of the transparent conductive material is provided so as to cover as the wide range as possible within the pixel "a" by performing the patterning. In this case, it is assumed that a common wiring 6 through which the common electrodes 15 for the pixels "a" are connected to each other may be made of a material having a more superior electrical conductivity in the same process as that for the scanning lines 5 so as to be wired in parallel with each of the scanning lines 5.

Application Examples

The display devices, described above, according to the present invention can be applied to display devices, of electronic apparatuses in all the fields, in each of which a video signal inputted to the electronic apparatus, or a video signal generated in the electronic apparatus is displayed in the form of an image or a video image. These electronic apparatuses are typified by various electronic apparatuses, shown in FIG. 6 to FIGS. 10A to 10G, such as a digital camera, a notebook-size personal computer, mobile terminal equipment such as a mobile phone, and a video camera. Hereinafter, examples of electronic apparatuses to each of which the present invention is applied will be described.

Figure 6:
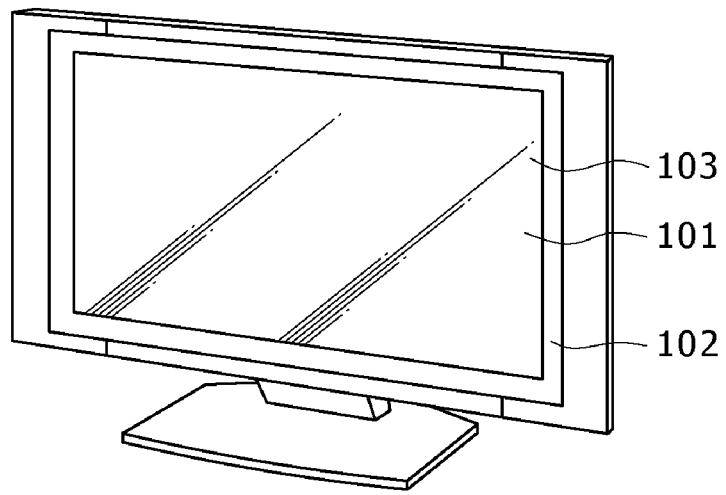
FIG. 6 is a perspective view of a television set as an application example to which the present invention is applied.

FIG. 6 is a perspective view showing a television set to which the present invention is applied. The television set according to this application example includes an image display screen portion 101 composed of a front panel 102, a filter glass 103, and the like. Also, the television set is manufactured by using the display device according to the present invention as the image display screen portion 101.

Figure 7A:
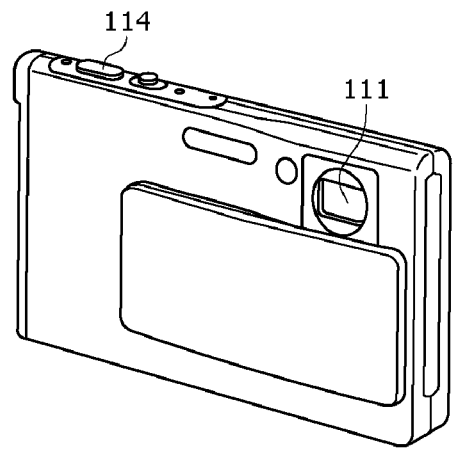
FIGS. 7A and 7B are respectively a perspective view of a digital camera as another application example, when viewed from a front side, to which the present invention is applied, and a perspective view of the digital camera as the another application example, when viewed from a back side, to which the present invention is applied.
Figure 7B:
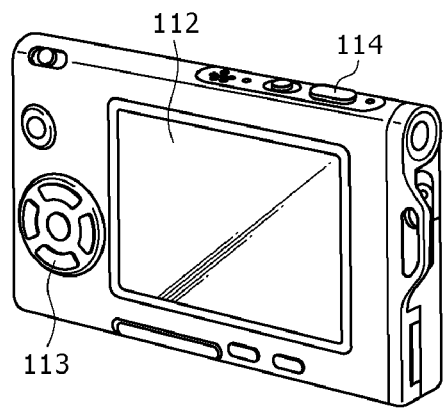

FIGS. 7A and 7B are respectively perspective views showing a digital camera to which the present invention is applied. FIG. 7A is a perspective view when the digital camera is viewed from a front side, and FIG. 7B is a perspective view when the digital camera is viewed from a back side. The digital camera according to this application example includes a light emitting portion 111 for flash, a display portion 112, a menu switch 113, a shutter button 114, and the like. The digital camera is manufactured by using the display device according to the present invention as the display portion 112.

Figure 8:
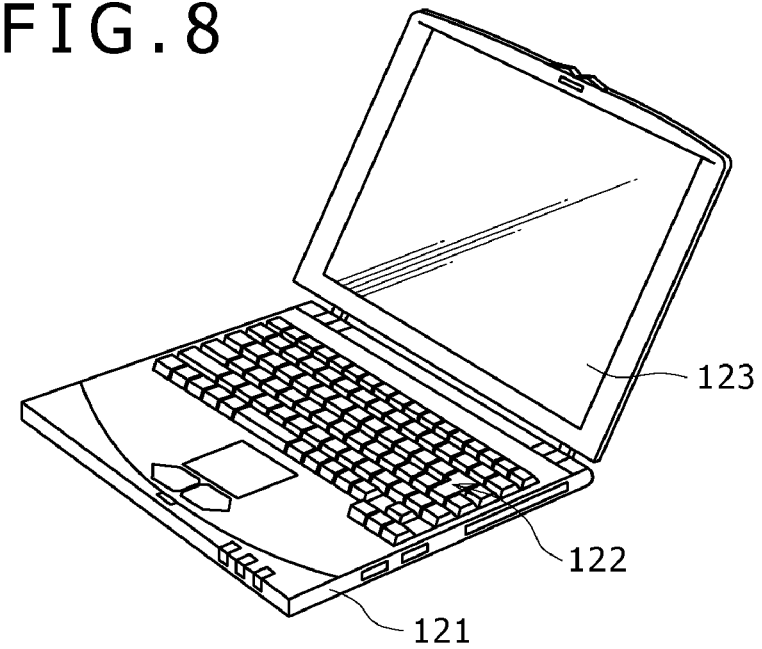
FIG. 8 is a perspective view showing a notebook-size personal computer as still another application example to which the present invention is applied.

FIG. 8 is a perspective view showing a notebook-size personal computer to which the present invention is applied. The notebook-size personal computer according to this application example includes a main body 121, a keyboard 122 which is manipulated when characters or the like are inputted, a display portion 123 for displaying thereon an image, and the like. The notebook-size personal computer is manufactured by using the display device according to the present invention as the display portion 123.

Figure 9:
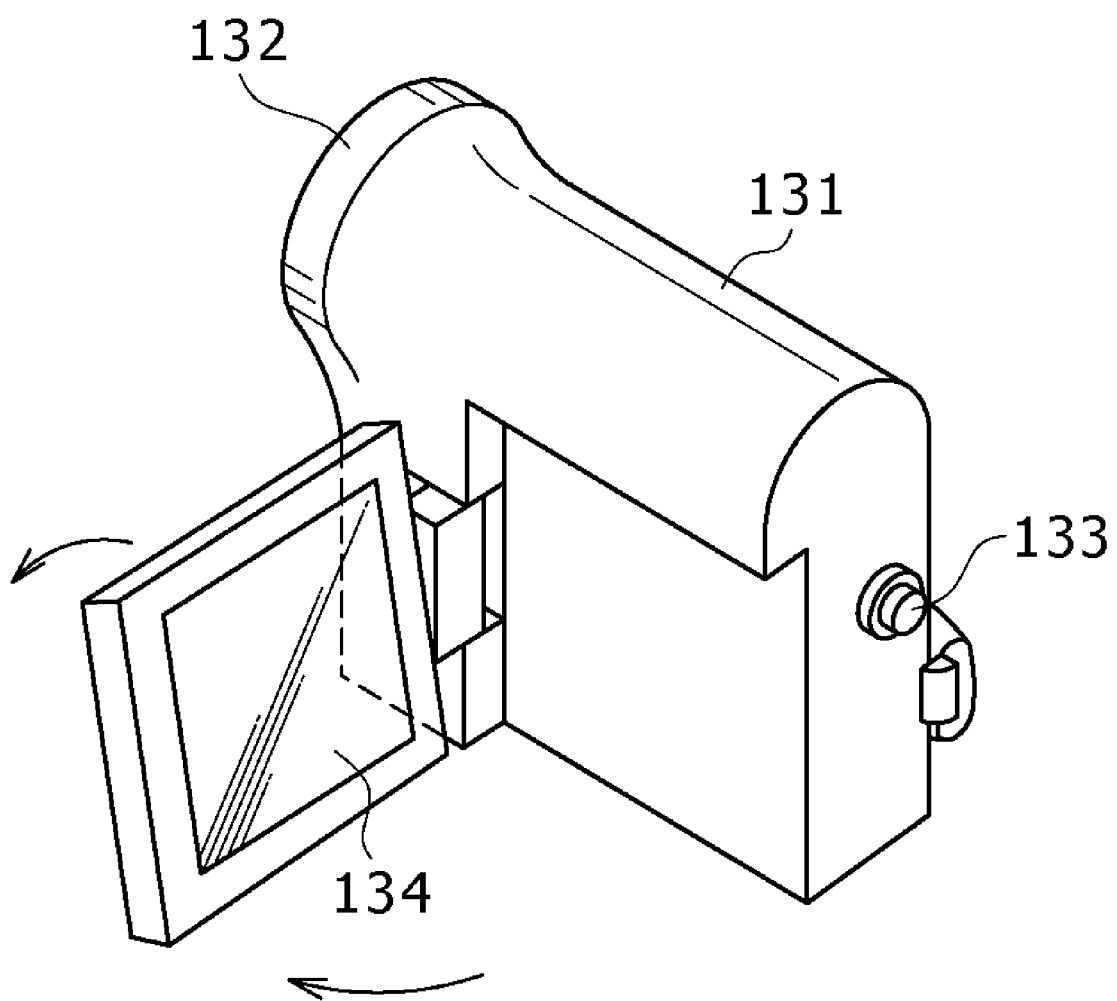
FIG. 9 is a perspective view showing a video camera, as yet another application example, to which the present invention is applied.

FIG. 9 is a perspective view showing a video camera to which the present invention is applied. The video camera according to this application example includes a main body portion 131, a lens 132 which captures an image of a subject and which is provided on a side surface directed forward, a start/stop switch 133 which is manipulated when an image of a subject is captured, a display portion 134, and the like. The video camera is manufactured by using the display device according to the present invention as the display portion 134.

FIGS. 10A to 10G are respectively views showing mobile terminal equipment, for example, a mobile phone to which the present invention is applied. FIG. 10A is a front view in an open state of the mobile phone, FIG. 10B is a side view in the open state of the mobile phone, FIG. 10C is a front view in a close state of the mobile phone, FIG. 10D is a left side view of the mobile phone, FIG. 10E is a right side view of the mobile phone, FIG. F is a top plan view of the mobile phone, and FIG. 10G is a bottom view of the mobile phone. The mobile phone according to this application example includes an upper chassis 141, a lower chassis 142, a connection portion (a hinge portion in this case) 143, a display portion 144, a sub-display portion 145, a picture light 146, a camera 147, and the like. The mobile phone is manufactured by using the display device according to the present invention as the display portion 144 or the sub-display portion 145.

It should be understood by those skilled in the art that various modifications, combinations, sub-combinations and alterations may occur depending on design requirements and other factors insofar as they are within the scope of the appended claims or the equivalents thereof.

What is claimed is:

1. A display device:
   a pair of opposing substrates;
   a common electrode carried on one of the substrates;
   a plurality of pixel electrodes also carried on the one substrate; and
   a liquid crystal layer between the substrates,
   wherein each of said pixel electrodes comprises
   (a) a plurality of electrode portions disposed in parallel with one another, each of the electrode portions having a single bend at approximately a central portion thereof relative to an extension direction thereby imparting a V-shape to each of the electrode portions,
   (b) respective end edge bridges connecting the electrode portions to one another at respective end portions of the electrode portions, each of the electrode portions having two end portions disposed respectively about the central portion thereof, and the respective end edge bridges connecting the electrode portions to one another at both respective end portions of the electrode portions, and
   (c) a central bridge portion connecting the electrode portions to one another at the bending portions, the central bridge portion disposed in parallel with the end edge bridges, the central bridge portion having a plurality of lateral edges at which the plurality of electrode portions connect to the central bridge portion, the lateral edges of the central bridge portion being angled relative to a direction along which the central bridge portion extends so that each of the electrode portions connects to a respective lateral edge of the central bridge portion at approximately a right angle.

2. The display device according to claim 1, wherein a space portion surrounded by corresponding ones of the electrode portions and the central bridge portion is structured to have approximately a rectangular flat surface shape.

3. The display device according to claim 1, including a light shielding portion which overlaps the central bridge portion.

4. The display device according to claim 1, wherein the pixel electrodes are positioned on a liquid crystal layer side of the common electrode and an insulating film is positioned between the pixel electrodes and the common electrode.

5. The display device according to claim 1, wherein a sensor portion is provided in each display region in which the pixel electrodes are disposed, respectively.

6. A pixel electrode for a liquid crystal display device in which the pixel electrode is disposed over a common electrode in an manner insulated therefrom, wherein the pixel electrode comprises:
   (a) a plurality of electrode portions disposed in parallel with one another, each of the electrode portions having a single bend at approximately a central portion thereof relative to an extension direction thereby imparting a V-shape to each electrode portion;
   (b) respective end edge bridges connecting the electrode portions to one another at respective end portions of the electrode portions, each of the electrode portions having two end portions disposed respectively about the central portion thereof, and the respective end edge bridges connecting the electrode portions to one another at both respective end portions of the electrode portions; and
   (c) a central bridge portion connecting the electrode portions to one another at the bending portions, the central bridge portion disposed in parallel to the end edge bridges, the central bridge portion having a plurality of lateral edges at which the plurality of electrode portions connect to the central bridge portion, the lateral edges of the central bridge portion being angled relative to a direction along which the central bridge portion extends so that each of the electrode portions connects to a respective lateral edge of the central bridge portion at approximately a right angle.

7. The pixel electrode of claim 6, wherein the pixel electrode is sinking comb shaped.

* * * * *